Aug. 19, 1930.  R. M. KERR  1,773,683
MACHINE FOR FILLING CONTAINERS WITH FROZEN CONFECTIONS
Filed July 25, 1927   3 Sheets-Sheet 1

Robert M. Kerr,
INVENTOR
BY Victor J. Evans
ATTORNEY

WITNESS: P. A. Hickey

Aug. 19, 1930.   R. M. KERR   1,773,683
MACHINE FOR FILLING CONTAINERS WITH FROZEN CONFECTIONS
Filed July 25, 1927   3 Sheets-Sheet 2
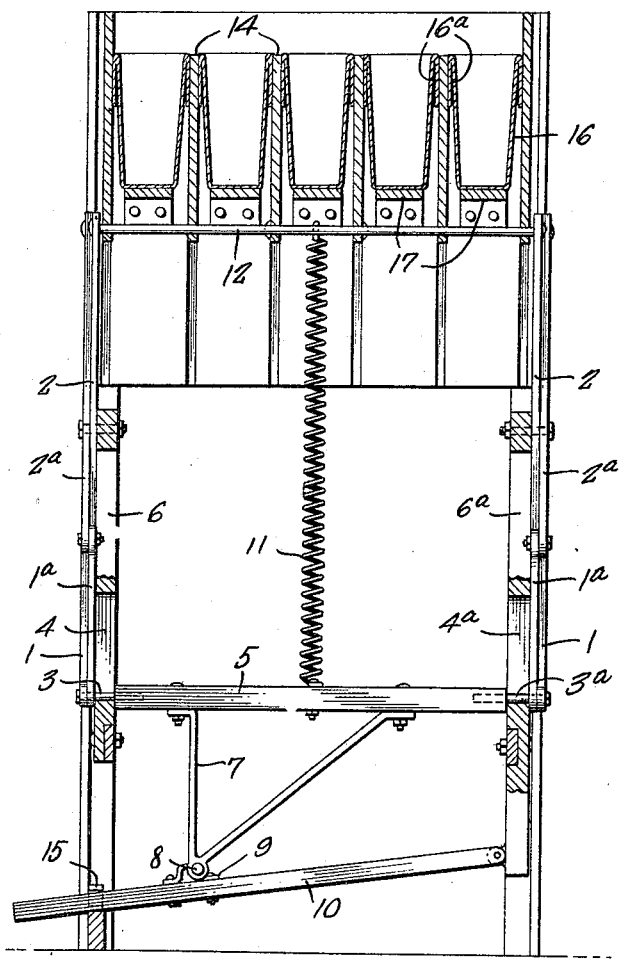
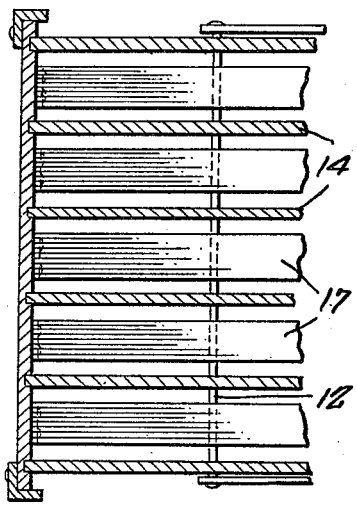
Robert M. Kerr,
INVENTOR
BY Victor J. Evans
ATTORNEY Aug. 19, 1930.  R. M. KERR  1,773,683
MACHINE FOR FILLING CONTAINERS WITH FROZEN CONFECTIONS
Filed July 25, 1927  3 Sheets-Sheet 3
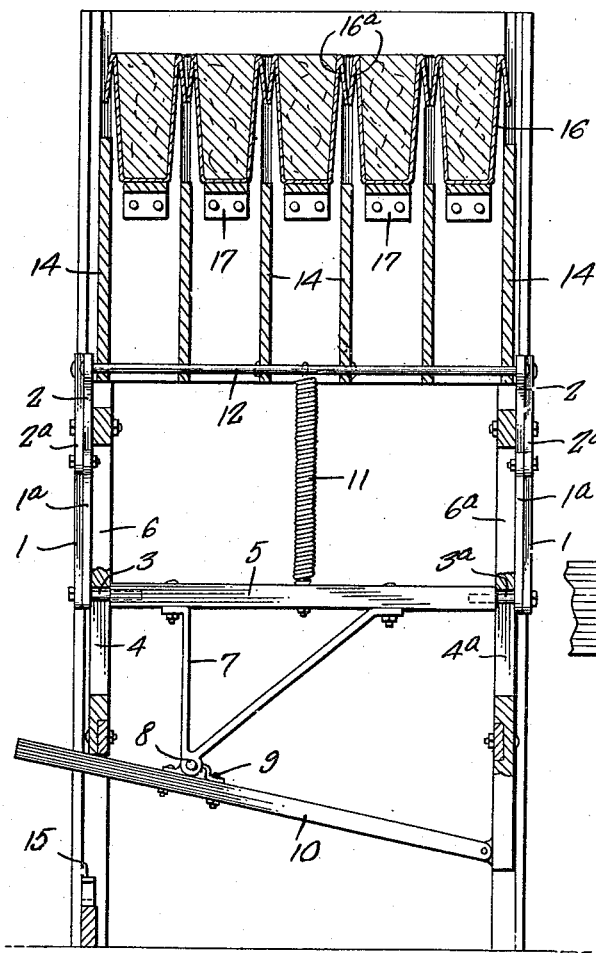
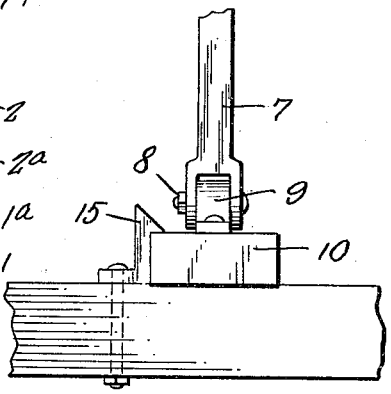

Patented Aug. 19, 1930

1,773,683

UNITED STATES PATENT OFFICE

ROBERT MILTON KERR, OF TITUSVILLE, PENNSYLVANIA

MACHINE FOR FILLING CONTAINERS WITH FROZEN CONFECTIONS

Application filed July 25, 1927. Serial No. 208,327.

This invention relates to means for filling frozen confections such as icecream.

In handling icecream and similar materials much waste is occasioned by retail distributors of such goods by lack of proper means for filling retailed small units of the confection, and it is the object of my invention to provide such a distributor with convenient mechanism by which multiple small units are adapted to contain for retail use a definite quantity of the frozen confection without material waste and with such convenience as will afford a minimum labor cost.

It is common to provide pasteboard containers either of a cylindrical form with covers or of a pyramidal form with foldable flaps by which the confection may be conveniently filled and either folded over for safe transit by a customer or a cover applied thereto. Where the distribution involves considerable trade it is economical on the part of the distributor to provide apparatus by which a small number of container units may be filled at one operation, thereby reducing the labor cost, and in carrying this out the icecream is poured at a temperature where it will flow readily into the container and set aside in a cold storage apparatus for hardening before dispensing to the customer. My invention relates to a device adapted to conveniently carry out such a system, especially with regard to the thin pasteboard containers with flaps to seal the contents.

In effecting the result I provide a rectangular stationary frame formed of angle iron so as to provide a solid prismatic framework in which the movable parts may be mounted. In the upper part of this framework I provide a plurality of relatively movable parallel partitions housing a plurality of stationary platforms adapted to support rows of small cardboard containers of a frozen confection as icecream. The partitions are connected by a pair of rods which control them as a unit and which is spring-controlled and connected with an operating lever to raise and lower the parallel partitions, which I preferably effect by a system of lazy tongs, the upper arms of which are adapted to move rods in slots of brackets of the partitions for moving the latter vertically, the lower end of the tongs being operated by a bar sliding up and down and the upward movement being against the tension of a retracting helical spring. Thus when the lever is depressed it acts upon the lower members of the lazy tongs, being guided in the vertical guides of the framework, thereby reacting upon a pair of pivoted members of the lazy tongs and drawing the ends of the tongs toward the axis of the machine, thus effecting a vertical lift of bars carrying a group of partitions, in which position the apparatus may be latched. This movement permits the cardboard containers to be snugly fitted in rows between the limiting walls of the partitions and forming a flush surface of a large group of containers flush with the upper edge of the partitions and forming an effective liquid-tight seal for the multiple containers. In this position the confection in a semi-fluid condition may be readily filled in the entire body of containers without any spilling. The latched control lever is then released, thereby permitting the lazy tongs to retract and lower the partitions from the tops of the containers, whereby the latter may be readily removed from the machine to cold storage to harden the confection.

My invention therefore comprises an apparatus for packaging frozen confections consisting of a plurality of reciprocable partitions adapted to be raised and lowered for filling and disbursing within a set of limiting fixed supports, and means for effecting such reciprocation comprising a pivoted lever acting upon a spring-pressed bar to raise and lower the container partitions.

It comprises also other more specific features, the novelty of which will be more fully hereinafter described and will be definitely indicated in the appended claims.

In the accompanying drawings:

Figure 2 is a sectional view taken at right angles to that of Figure 1.

Figure 3 is a similar view showing the alternate position of the mechanism.

Figure 4 shows a group of partitions relatively movable with respect to a plurality of intervening container supports.

Figure 5 is a detail of a latching device for holding the apparatus in filling position.

Figure 1:
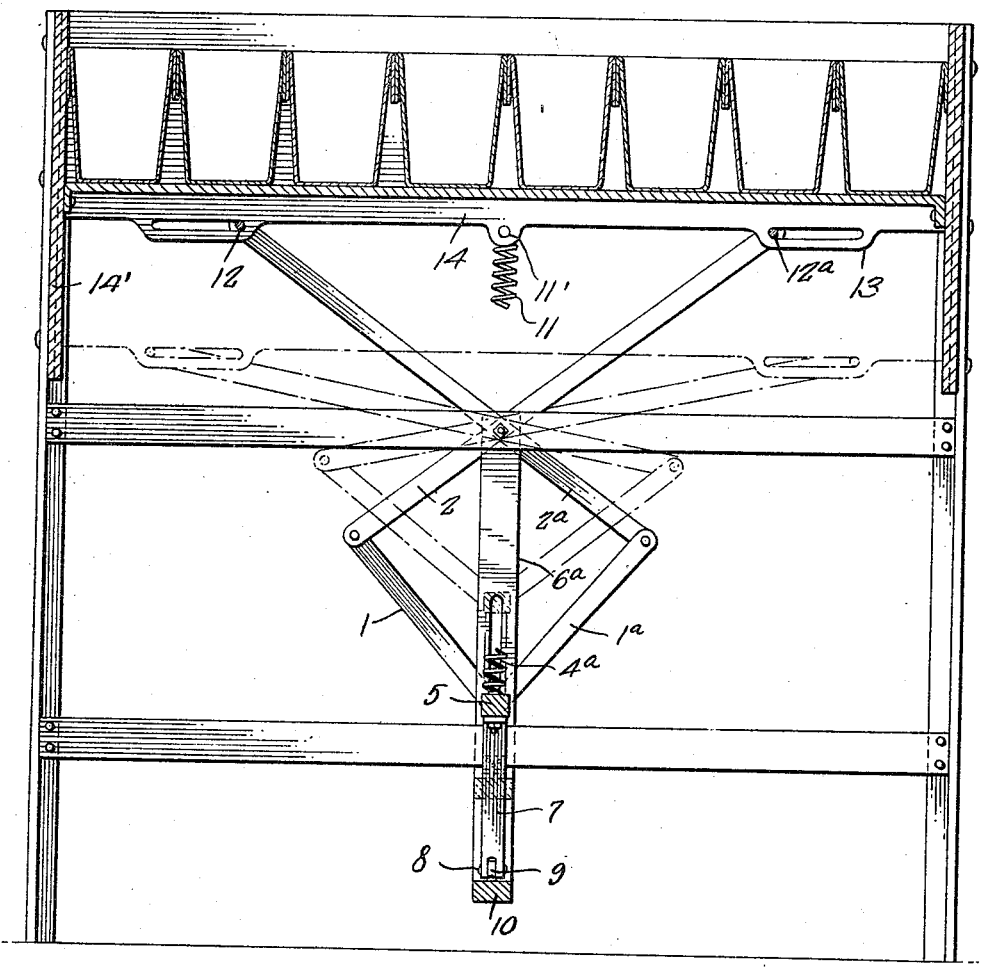
Figure 1 is a longitudinally vertical section taken through a filling machine embodying my invention.

Referring now in detail to the drawings, Figure 1 represents a system of lazy tongs 1, 1ª, 2, 2ª, the lower arms 1, 1ª being pivotally connected with rods 3 and 3ª that are vertically reciprocable in a pair of slots 4, 4ª in the framework, the rods 3, and 3ª being connected to a space bar 5 that is vertically slidable between the side posts, 6, 6ª of the framework. The bar 5 has connected thereto an angle member 7 which has its lower end pivoted at 8 in a bracket 9 bolted to a pedal 10 that is pivoted to the framework. The bracket 9 loosely receives the pivot 8 to allow free movement of the pedal as will be apparent upon inspection of Figure 3. The bar 5 has the lower end of a tension spring 11 connected thereto while the upper end of said spring is connected to a rod 11' arranged through ears formed with the lower edge of the partitions which will be presently described. Bars 12 and 12ª pivotally receive the upper ends of the upper arms 2 and 2ª and the upper arms have their lower ends pivotally secured to the lower arms 1 and 1ª.

The bars 12 and 12ª are movable in horizontally arranged slots provided in brackets 13 that are formed with the partitions 14, the latter being slidably mounted in grooves disposed vertically and in spaced parallel relation with respect to each other in side members 14' which are secured to the framework as best shown in Figure 1, thus the partitions 14 are vertically movable in a reciprocal manner by the operation of the lazy tongs, by the down and up movement of the pedal 10. When the pedal is depressed, the lazy tongs are spread and raise the group of partitions, and a latch 15 is fixed to the base of the frame for receiving the pedal as clearly shown in Figure 5 so as to fixedly secured the partitions in an up position as shown in Figure 2. When the partitions are in their upward position, they cooperate with the side members 14' to provide compartments for accommodating cardboard containers 16 which are placed in the compartments or rows, with their flaps 16ª tucked downwardly, and the containers are pushed downwardly until they are flush with the upper margin of the inner partitions as shown in Figure 2, the outer partitions being longer than the inner partitions. The containers are supported on fixed parallel bars 17 that have their ends bent at right angles thereto and bolted to the frame. When the several rows of containers have been inserted in place, the tops are flush with the inner partitions, whereby partly fluid ice cream can be poured in the containers and evenly spread flush with the tops thereof. After the containers have been filled, the pedal is released from its latch and the spring retracts the apparatus and lowers the partitions, thereby permitting the containers to be withdrawn and moved to a suitable platform or the like to be placed in cold storage so that the partly fluid ice cream will be hardened.

In Figure 1 the lazy tongs are shown with the partitions elevated as in Figure 2 and a row of containers snugly nested in the several rows, thus producing a flush surface upon which the viscous confection may be poured and distributed.

In Figure 3 the pedal is shown as being released and the spring retracted bringing the several partitions to their lower level and allowing the filled containers to be readily removed from the bars 17.

While I have described and shown the partitions as being movable, I desire it to be understood that the movable element might be the container supports while the partitions remained stationary. It is the relative movement that is the important factor affording a flush surface in the filling of the containers. I therefore desire to have it understood that modifications may be made within the scope of my claims without departing from the spirit of the invention.

Having thus described my invention, what I claim as new and desire to secure by Letters Patent is:

1. A filling machine comprising a frame, side members secured to said frame and being formed with grooves, means mounted for slidable movement in said grooves, brackets formed on said means and being provided with slots, ears formed on said means, pedal actuated means including means mounted in said slots for moving the first mentioned means vertically, means movable by the pedal, a rod mounted in the ears, a coil spring having its end convolutions secured to the rod and the last mentioned means respectively for urging the first mentioned means downwardly, and means cooperating with the first mentioned means for arranging the top of containers flush therewith upon movement of the first mentioned means in an upper position, and means for engagement with the pedal for latching the first mentioned means in an upper position.

2. A filling machine comprising a frame, side members secured to said frame and being provided with grooves, parallel arranged partitions mounted for slidable movement in said grooves, the upper edges of the outer partitions being disposed above the upper edges of the inner partitions, brackets formed on said partitions and being provided with slots arranged horizontally therein, ears formed on said partitions, a rod mounted in said ears, means for moving said partitions vertically in said grooves and including a pedal, means vertically movable by said pedal, a coil spring having its end convolutions secured to the last mentioned means and the rod respectively for urging the partitions to their lower position, bars mounted in said slots, means connecting the bars with the means movable vertically by the pedal, latching means on the frame for engagement with the pedal to fixedly secure the partitions in an upper position, bars secured to said side members and arranged for supporting containers in a position whereby the upper edges of the inner partitions are disposed flush with the tops of the containers and the upper edges of the outer partitions being disposed above said tops when the partitions are in their upper position, and said containers being readily removable when the partitions are disposed to their lower position.

In testimony whereof I affix my signature.

ROBERT MILTON KERR.